United States Patent [19]

Marom

[11] Patent Number: 4,707,077
[45] Date of Patent: Nov. 17, 1987

[54] REAL TIME IMAGE SUBTRACTION WITH A SINGLE LIQUID CRYSTAL LIGHT VALVE

[75] Inventor: Emanuel Marom, Tel Aviv, Israel

[73] Assignee: Hughes Aircraft Company, Los Angeles, Calif.

[21] Appl. No.: 823,913

[22] Filed: Jan. 30, 1986

[51] Int. Cl.[4] .................. G02B 27/46; G02F 1/13
[52] U.S. Cl. ................ 350/162.12; 350/162.15; 350/342; 350/345; 350/339 F
[58] Field of Search .......... 350/345, 331 R, 339 F, 350/334, 342, 351, 162.12, 162.15, 162.13, 162.14; 250/331

[56] References Cited

U.S. PATENT DOCUMENTS

| | | | |
|---|---|---|---|
| 3,744,879 | 7/1973 | Beard et al. | 350/162.12 |
| 3,764,211 | 10/1973 | Morse et al. | 350/342 |
| 3,790,280 | 2/1974 | Heinz et al. | 350/162.12 |
| 3,824,002 | 7/1974 | Beard | 350/342 |
| 3,976,361 | 8/1976 | Fraas et al. | 350/342 |
| 4,018,509 | 4/1977 | Boswell et al. | 350/342 |
| 4,019,807 | 4/1977 | Boswell et al. | 350/342 |
| 4,060,316 | 11/1977 | Pollack et al. | 350/342 |
| 4,124,278 | 11/1978 | Grinberg et al. | 350/342 |
| 4,127,322 | 11/1978 | Jacobson et al. | 350/342 |

OTHER PUBLICATIONS

Ebersole, "Optical Image Subtraction", vol. 14, No. 5, Sep.-Oct. 1975, Optical Engineering.

*Primary Examiner*—Stanley D. Miller
*Assistant Examiner*—Trong Q. Phan
*Attorney, Agent, or Firm*—V. D. Duraiswamy; A. W. Karambelas

[57] ABSTRACT

A technique for subtracting images in real time utilizing a single liquid crystal light valve (LCLV) is described. The two images are projected on the LCLV through a common grating in a well-determined geometry. The interrogating light beam is optically filtered, so that only different features in the two images are revealed.

5 Claims, 2 Drawing Figures

REAL TIME IMAGE SUBTRACTION WITH A SINGLE LIQUID CRYSTAL LIGHT VALVE

This invention was made with Government support under contract F49620-84-C-0096 awarded by the United States Air Force. The Government has certain rights in this invention.

FIELD OF THE INVENTION

This invention relates to image or optical data processing and more particularly to apparatus and method for subtracting images in real time. The present invention further relates to utilizing a single liquid crystal light valve for subtraction of two images in real time.

BACKGROUND OF THE INVENTION

Optical subtraction of images is an important processing operation used extensively in various disciplines interested in the extraction of difference information between two optical images. These disciplines include area surveillance, robotics, inspection and quality control, photography, microelectronics and photogrammetry. In most of these applications two records or images are available simultaneously, in the form of photographs, slides, prints, or other fixed media. However, comparison between a real time image and one that has been previously stored (on film, etc.) is of great significance.

Several techniques have been suggested in the past for optically obtaining a subtraction of, or registering a difference between, two images. A comprehensive review of previous image subtraction techniques appears in "Optical Image Subtraction", by John F. Ebersole, Optical Engineering, Vol. 14, No. 5, Sept.–Oct. 1975, pp 436–447. This paper provides an extensive review of image subtraction techniques using both coherent and incoherent based optical systems, with real time or delayed-time processing. Most techniques require the use of several sequential operations and possibly generation of intermediate image records. Generally these techniques suffer from insufficient dynamic range, poor signal-to-noise ratio, and lack real time operation capability. Some of the techniques require polarization of the sources illuminating the images to be compared. In addition, many of these techniques utilize quite complex optical apparatus which is not desirable in many commercial applications.

More recently an apparatus utilizing two liquid crystal light valves was demonstrated and disclosed in U.S. Pat. No. 4,124,278, issued to E. Marom and J. Grinberg Nov. 7, 1978. In this patent Marom and Grinberg disclose a subtraction apparatus in which two images, a positive replica of one input and a negative replica of a second input, are superimposed in registration by using two liquid crystal light valves. This positive-negative superposition results in subtracted features between the two images appearing, in real time, as either bright or dark regions on an average grey background. While image subtraction is performed in real time, the contrast is lower than desired for some applications.

Prior to that, in "Real Time Grid Coding and Interlacing for Image Subtraction" in Appl. of Holography and Optical Data Processing, Eds. E. Marom, A. A. Friesem and E. Weiner-Avnear, Pergamon Press, 85–91 (1977), Konforti and Marom also described a method by which two images to be subtracted are multiplied by complimentary coding functions (i.e. Ronchi rulings) and then recorded on a common medium. Subsequent filtering of the composite image reveals the difference on a dark background. In this system the subtracted image has very good contrast but the subsequent filtering necessary to reveal the subtraction is time delayed. Even adding a video camera and monitor to such a system to achieve real time display of the image subtraction is limited by the resolution of conventional cathode ray tubes which greatly reduces the usefulness of this technique.

What is needed then is a method and apparatus for realizing real time image subtraction in a less complex yet high resolution, good contrast, large dynamic range manner.

SUMMARY

Therefore, it is a purpose of the present invention to provide for the subtraction of optical images in real time.

It is another purpose of the present invention to provide for optical subtraction of optical images while maintaining high image resolution.

It is yet another purpose of the present invention to provide for optical subtraction of optical images with the resultant image having good contrast and a large dynamic range.

It is a further another purpose of the present invention to provide apparatus for providing subtraction of optical images in real time having a decreased complexity of design.

These purposes and other advantages of the invention are realized in an apparatus for performing image subtraction in real time using a single liquid crystal light valve (LCLV).

The two images to be subtracted are projected onto the write side of the liquid crystal light valve through a common Ronchi grating in a well-determined geometry. The Ronchi grating is positioned adjacent the write side of the light valve in the optical path of the input images and spaced apart from the light valve by a distance equal to or less than the Rayleigh length for the average spectral wavelength produced by the input images. The Ronchi grating also has a periodicity approximately equal to or greater than twice the highest spectral frequency provided by the input images.

Readout means projecting a coherent optical beam on the readout side of the liquid crystal light valve where it is reflected toward an image plane as an output beam. A readout imaging means projects the reflected readout beam onto the image plane. At the same time optical filter means positioned in the optical path of the readout beam before the image plane, provides filtering of all but one of the odd spectral orders of the output beam, so that only different features in the two images are preserved and revealed.

In a further aspect of the invention, input means for projecting the images onto the write side of the liquid crystal light valve comprise a first input lens for directing the first input image along a first optical path and a second input lens for directing the second input image along a second optical path. An optical beam or image combination means is positioned so as to intercept the images traversing the first and second optical paths and redirect them along third and fourth optical paths respectively which intercept the write side of the light valve at angles of incidence which differ by a predetermined amount such that the two images are interlaced by said Ronchi grating. For a different embodiment the two images could be projected on the write side of the LCLV without a beam splitter by using two slightly oblique propagation directions.

The readout means can comprise a polarizing beam splitter positioned between the readout imaging means and a source of coherent optical radiation whereby a readout beam is directed to the readout side of said liquid crystal light valve and a reflected readout beam is directed toward the readout imaging means.

The filter means can comprise an optical slit positioned in the path of the readout beam between the output imaging means and the image plane and adjusted in width so as to filter all but one of the odd spectral orders of the output beam.

DRAWINGS

FIG. 1 illustrates an image subtraction apparatus constructed according to the principles of the present invention.

FIG. 2. illustrates a Ronchi grating for use in the apparatus of FIG. 1.

DETAILED DESCRIPTION

The present invention provides an optical output comprising the subtraction of two input images and does so in a dynamic or real time manner. This is accomplished in an optical subtraction apparatus utilizing a single liquid crystal light valve (LCLV) to reflect and modulate a coherent readout beam and using two input images, which are to be subtracted, as the write or control beams for the LCLV.

Figure 1:
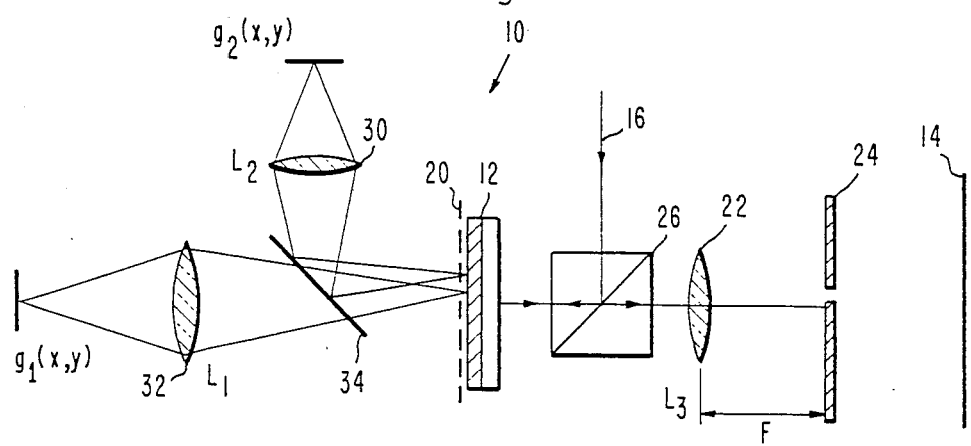

This is illustrated in FIG. 1 where an image subtraction apparatus 10 constructed according to the principles of the present invention is shown. Subtraction apparatus 10 employs a liquid crystal light valve 12 positioned along an optical path for receiving two input images here represented as $g_1$ and $g_2$.

LCLV 12 can be one of several liquid crystal light valve structures such as, but not limited to, the one disclosed in U.S. Pat. No. 3,824,002 issued to T. Beard on July 16, 1974. The operational details of LCLV's are further illustrated in publications such as "Photoactivated Birefringent Liquid Crystal Light Valve for Color Symbology Display," J. Grinberg et al, IEEE Trans. on Elec. Dev., Vol. ED 22, pp 775-783 (1975) or U.S. Pat. No. 3,976,361 issued to L. M. Fraas et al on Aug. 24, 1976 and U.S. Pat. No. 4,019,807 issued to D. D. Boswell et al on Apr. 26, 1977. The basic operating characteristics of LCLV structures as illustrated in the above publications are known to those skilled in the art of LCLV manufacture and image display. A brief summary is included here for illustrating the operation of the LCLV 12 as part of optical subtraction apparatus 10.

A LCLV comprises a layer of liquid crystal material sandwiched between an optically transparent electrode on one side and a reflective layer, a light blocking layer, a photosubstrate and an optically transparent electrode on the other. In addition, depending upon the application and the design details other material layers acting as insulators, optical absorbers or reflectors, or conductors may be used.

On the input or "write" side of the light valve a photosubstrate is used to absorb or interact with input radiation and create signal electrons. These signal electrons are transferred toward the liquid crystal layer although they are generally insulated from flowing directly into the liquid crystal material.

At the same time a power source connected to the optically transparent electrodes establishes a voltage across the LV structure and across the liquid crystal material. In the "dark" or "off" state, when subjected to this voltage, the liquid crystal molecules orient themselves across the layer in a particular and predetermined fashion in the liquid crystal layer. When optical radiation interacts in the photosubstrate, however, charge is transferred through the liquid crystal layer, via one of several mechanisms, causing voltage fluctuations across the liquid crystal layer. When this happens, the liquid crystal molecules now experience changing or modulating electric fields and reorient themselves accordingly in response to the modulating voltages.

In the meantime, a "readout" beam is projected onto the LCLV from an opposite direction than the input or write beam and also on the opposite side from the photosubstrate. Light block or reflecting layers prevent the readout beam from entering the photosubstrate in any significant quantity, as well as preventing the write beam from reaching the liquid crystal material. The readout beam travels through the liquid crystal material where it is then reflected and back through the liquid crystal material and out of the LCLV as an output beam. However, as the readout beam traverses the liquid crystal molecules, they will alter the polarization of the light depending upon their orientation. Therefore, fluctuations in the liquid crystal layer created by the write beam become fluctuations in the readout beam after the beam passes through a polarizer. All that remains is to separate the out going readout beam from the input readout beam to receive a transferred image. This is achieved in FIG. 1 by the polarizing beam splitter 26.

In the present invention LCLV 12 is used to modulate and reflect a readout beam 16 to produce an optical output which is the subtraction of two inputs $g_1$ and $g_2$. The readout beam 16 is provided by a source (not shown) of coherent radiation which is functional at the wavelength desired for the output of subtraction apparatus 10 and for which the LCLV 12 is designed.

Figure 2:
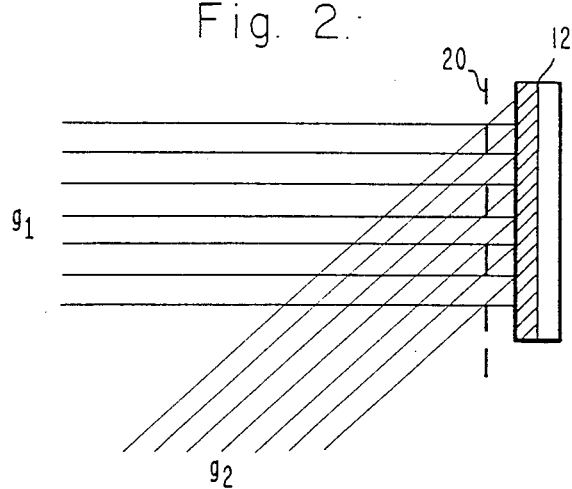

The actual image subtraction occurs due to a coding function applied to the two input images $g_1$ and $g_2$ by a Ronchi grating 20 positioned adjacent to the input or write side of LCLV 12. To understand how this functions we look more closely at the projection of two images $g_1$ and $g_2$ through the Ronchi grating 20 as illustrated in closer detail in FIG. 2.

The projection of an image $g_1$ through the Ronchi grating 20 (of period p) results in an intensity distribution I that can be described by $$I_1 = g_1(x,y) \cdot \left[ \sum_{n=-\infty}^{\infty} C_n \cos \frac{2n\pi}{p} y \right] \quad (1)$$

where (x,y) are the Cartesian coordinate in object space, $C_n$ is the coefficient of expansion of the Ronchi grating in Fourier spectra, and the term in brackets is the spatial spectral decomposition of the Ronchi grating 20. The second image, $g_2$, projected through the same Ronchi ruling but displaced by half a cycle, will result in $$I_2 = g_2(x,y) \cdot \left[ \sum_{n=-\infty}^{\infty} C_n \cos \frac{2n\pi}{p} \left( y - \frac{p}{2} \right) \right] \quad (2)$$

$$= g_2(x,y) \cdot \left[ \sum_{n=-\infty}^{\infty} (-1)^n C_n \cos \frac{2n\pi}{p} y \right]$$

When these two images, in registration, are simultaneously present on the photoconductive surface of the LCLV 12 which is read by coherent beam of light 16, the light distribution in the focal plane of an imaging lens 22 will be proportional to $$I_T \simeq \sum_{n=\ldots,-2,0,2,4\ldots} C_n \left[ G_1\left(u, v + \frac{n}{p} \lambda f\right) + G_2\left(u, v + \frac{n}{p} \lambda f\right) \right] + \sum_{n=\ldots,-1,1,3,5\ldots} C_n \left[ G_1\left(u, v + \frac{n}{p} \lambda f\right) - G_2\left(u, v + \frac{n}{p} \lambda f\right) \right] \quad (3)$$

where G(u,v) is the Fourier transform of g(x,y), f is the focal distance of the output lens 22, and Lambda is the wavelength of the readout light beam 16.

The reflected readout beam 16 is then passed through an optical slit 24 positioned in the focal plane of the imaging lens 22 so that only one of the odd orders is allowed to pass, the light distribution displayed on the output plane 26 is proportional to $$I_{out} \simeq |g_1(x,y) - g_2(x,y)|^2 \quad (4)$$

which is the desired result of subtraction of images $g_1$ and $g_2$.

The interlacing of the two modulated inputs is achieved by relying on the proximity focusing of the Ronchi grating 20. Grating 20 will limit the utilizable spatial frequency of each image $g_1$, $g_2$ and the subtracted result, since the Shannon-Whittaker sampling theorem, as known in the art, dictates that sampling should be done at least at twice the highest frequency of the system. Higher frequencies in the apparatus, if present, will suffer from aliasing.

In subtraction apparatus 10, the Ronchi grating should be placed at a separation distance not greater than the Rayleigh distance, so that its shadow image would maintain the original grating features. For a grating of 12 lp/mm illuminated by light having a central wavelength at 0.5 $\mu$m, this distance should be smaller than 3.5 mm.

In order to direct readout beam 16 to the readout side of LCLV 12 one or more reflective surfaces (not shown) can be employed. However, in order to provide the output image a means is required to separate the reflected beam 16 from the input beam 16 and to prevent the reflected, information bearing, beam 16 from simply returning to the optical source. This is accomplished by using a polarizing beam splitter 26 to reflect beam 16 into LCLV 12. The beam splitter 26 acts also as a polarization analyzer of the beam 16 so that upon reflection it will pass back through the beam splitter to output lens 22 and not reflect back to the coherent source the light portions that have been modulated by the LCLV 12. Any component reflected back to the source of beam 16 is considered to be small.

At the same time, the input images $g_1$ and $g_2$ can be directed to the write or input side of the LCLV 12 by one or more reflective surfaces (not shown) and image lenses such as lenses 30 and 32. Using a beam splitter 34 allows the projection of one image, such as $g_2$, to occur at an incident angle different from that of $g_1$ so as to allow the proper interlaced coding of the images as would be readily understood by those skilled in the art for Ronchi gratings.

EXAMPLE

The above described apparatus for subtraction was employed with two images which were transparencies illuminated with incoherent light.

The images were passed through lenses 30 and 32 respectively which were substantially identical 117 mm focal length lenses. The images were projected onto the input plane of LCLV 12 which was a commercially available LCLV employing a CdS photoconductive surface and having a response time on the order of 15 msec.

The Ronchi grating was a commercially available grating having a ruling density of 12 line pairs/mm (lp/mm). The grating was positioned approximately 1.5 mm from LCLV 12, which was well within the Rayleigh distance.

Output lens 22 had a focal length of 400 mm and projected the output image from LCLV 12 onto a projection screen. The slit used to filter the undesirable orders of magnitude was a variable width slit adjusted to a width of about 1.2 mm and centered in the position of the first diffraction order of the apparatus which was about 2.4 mm.

Experimental data yielded image subtraction limited in resolution only by the spatial frequency of the encoding Ronchi grating 20.

Thus what has been described is an apparatus and method for providing the optical subtraction of two images in real time.

The foregoing description of preferred embodiments has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. An image subtraction apparatus for subtracting a first and a second input image, comprising:
   a liquid crystal light valve having a write side and a readout side;
   input means for projecting said first and second images onto the write side of said liquid crystal light valve;
   a Ronchi grating positioned adjacent said write side of said liquid crystal light valve in the optical path of said input images and spaced apart from said liquid crystal light valve by a distance equal to or less than the Rayleigh length for the average spectral wavelength produced by said input images and having a spatial frequency approximately equal to or greater than twice the highest spectral frequency provided by said input images;

readout means for projecting a coherent optical beam on the readout side of said liquid crystal light valve where it is reflected toward an image plane where it is an output beam;

readout imaging means for focusing the reflected readout beam onto an output image plane;

optical filter means positioned in the optical path of said readout beam between said readout imaging means and said image plane for filtering all but one of the odd spectral orders for said output beam.

2. The apparatus of claim 1 wherein said readout means comprises a polarizing beam splitter positioned between said readout imaging means and a source of coherent optical radiation whereby a readout beam is directed to the readout side of said liquid crystal light valve and a reflected readout beam is directed toward said readout imaging means.

3. The apparatus of claim 1 wherein said input means comprises:

a first input lens for directing said first input image along a first optical path;

a second input lens for directing said second input image along a second optical path;

optical beam or image combination means positioned so as to intercept said first and second images traversing said first and second optical paths and redirect them along third and fourth optical paths respectively which intercept the write side of said liquid crystal light valve at angles of incidence which differ by a predetermined amount such that the two images are interlaced by said Ronchi grating.

4. The apparatus of claim 1 wherein said filter means comprises an optical slit positioned in the path of said readout beam between said imaging means and said image plane and adjusted in width so as to filter all but one of the odd spectral orders for said output beam.

5. The apparatus of claim 1 further including optical interpretation means for intercepting said output beam and recording the resultant image therein.

* * * * *